United States Patent Office 3,162,538
Patented Dec. 22, 1964

3,162,538
VEGETABLE BASE FOOD COLORING FOR
OLEOMARGARINE AND THE LIKE
Paul H. Todd, Jr., Kalamazoo, Mich., assignor to Kalamazoo Spice Extraction Company, Kalamazoo, Mich., a corporation of Michigan
No Drawing. Filed Apr. 26, 1962, Ser. No. 190,226
9 Claims. (Cl. 99—148)

This invention relates to improvements in vegetable base food coloring for oleomargarine and the like. This application is a continuation-in-part of my prior-filed copending application Serial No. 667,682, filed June 24, 1957, now abandoned. The principal objects of this invention are:

First, to provide a novel coloring composition that imparts a desirable yellow color to oleomargarine and the like that will not change or discolor during normal store shelf life of these products, oleomargarine colored therewith, and a process for the production of such coloring composition.

Second, to provide a novel coloring composition that is less expensive than non-toxic coloring compositions used for the same purpose heretofore, said economy being due to the fact that it is unnecessary to employ heating to improve the stability and solubility of the naturally occurring vegetable coloring pigment of the composition of the present invention, which coloring pigment moreover retains its full original coloring power in the composition of the present invention.

Other objects and advantages of the invention will be apparent from a consideration of the following description and claims.

PRIOR ART

An understanding of the present invention will be facilitated by a consideration of the existing coloring materials used for similar purposes and the problems which they have raised. Synthetic coal tar colors have been widely used and have been satisfactory both from a color and cost standpoint, but they have recently been determined to be toxic and are therefore now undesirable.

Natural and synthetic carotenes have been used to color butter and margarine, but when used in higher concentrations they give a reddish orange color that is unnatural and therefore undesirable. They are also the highest cost colorings known for the purpose.

Saffron and turmeric are other natural vegetable materials that have been used separately for coloring, but they are not used commercially in the coloring of fatty foods. Saffron is expensive, while turmeric, if used in sufficient amount to color a food such as margarine, imparts an undesirable greenish cast. In addition, turmeric is a relatively weak color when used in vegetable oils and is, for this reason, expensive in amounts sufficient to be effective. The active natural vegetable coloring pigment of turmeric is curcumin.

Another vegetable material is available for food coloring, namely annatto seed, which contains the naturally occurring vegetable pigment known as bixin, along with other carotenoid compounds which may also be suitable for food coloring. This pigment is much cheaper than the carotenes. The bixin, which comprises approximately ninety percent of the coloring power of the annatto seed, is characterized by a high degree of coloring power and also by a yellow-orange hue which is suitable for the coloring of dairy products, in particular oleomargarine. Although bixin, as extracted from annatto seed, is a very powerful coloring pigment, its effective use and incorporation into coloring compositions is attended by serious difficulties due to low solubility, instability, and especially its tendency to "redden-out" when used to color fatty or oily foods, such as oleomargarine.

Bixin has already been extracted from annatto seed using an edible oil to provide a saturated solution, as for example by Ellis, U.S. Patent 1,203,594, issued November 7, 1916, but, because of the aforesaid low solubility, the bixin being soluble only to the extent of approximately .05% in an edible oil such as cotton-seed, soybean, or peanut oil, such saturated oil solutions do not contain sufficient of the bixin for commercially feasible use, which is limited by the amount of oil solution which can be combined with the product to be colored and the cost of shipping large quantities of solution among other things.

The limited value of bixin as a coloring material, particularly for fatty foods such as margarine or butter, because of its low solubility in oils and fats, is recognized in column 1 of Perret U.S. Patent 2,830,908, issued April 15, 1958, according to which patent other means are resorted to in an attempt to provide a more suitable vegetable base food coloring material.

Certain alkaline annatto extracts have also been proposed for coloring butter, cheese and oleomargarine, but these have been generally unsatisfactory, especially for coloring oleomargarine. They are relatively cheap, but when used in the form of alkaline solutions the caustic tends to saponify fats in the food and impart to them an objectionable soap-like taste. Sodium salts of the fatty acids are believed to be the cause of this taste. The colors obtained with these alkaline extracts are moreover undesirable. They are orange-brown and unclear, rather than the desired yellow-orange, and may turn pinkish or violet during storage of the food product. Therefore, alkaline annatto extracts have not been found suitable for coloring fatty foods.

This deficiency in alkaline annatto extracts was already clearly recognized by Dake in U.S. Patent 59,975, issued November 27, 1866, who proposed to subject annatto seeds to cutting or tearing thereby to release the coloring matter into a "pure oil of butter," rather than extract it with alkali, which as now established actually converts normally unstable bixin to norbixin by demethylation.

Annatto extracts have also been used as microcrystalline suspensions in vegetable oil. The color pigment of annatto, essentially the normally unstable bixin, is extracted, ground, and incorporated in vegetable oil. It is cheaper than the carotenes, but has a pronounced tendency to "redden-out," as referred to by the trade, following the preparation of the colored oleomargarine or other edible oil or fat, and this phenomenon is especially pronounced when suspensions of the bixin are employed. The only previously available commercial suspension of bixin was withdrawn from the market because of just this problem. Immediately following preparation such a margarine, for example, will appear orange, but within two or three weeks it frequently develops a pinkish or purple cast. Various theories have been propounded as to the cause of this, such as isomerization or oxidation of the bixin, but there is as yet no conclusive evidence as to exactly what actually happens to the bixin itself. In any case, the visual effect is to decrease the amount of yellow light reflected by the margarine, without changing the amount of red reflected. This "reddening-out" problem is characteristic of all solution or suspension coloring compositions employing the normally unstable bixin which have been proposed to date, with the exception of the compositions of the present invention. The problem has been recognized in scientific publications. Geminder et al., infra, state: "Barnicoat (3, 4) as well as various margarine technologists (1) have reported that these annatto colors frequently produce red and other 'off colors' during storage in finished margarines and dairy products."

The principal reference citations are given at the end of the Geminder article.

A second coloring pigment derived from annatto is isomerized bixin, known to the trade as "annatto buttercolor." This material has as its main components transformation or isomerization products of bixin. Although the isomerized bixin has the advantages of increased solubility in edible oils and improved stability, and is not characterized by a tendency to change color or "reddenout" when used as a coloring for fatty foods, as is the case with bixin itself, unfortunately it is nowhere near as economical as bixin, inasmuch as it has only approximately twenty percent of the coloring power of bixin. Whereas early researchers may have converted bixin to isomerized bixin inadvertently by heating or cooking, the distinction between bixin and isomerized bixin and their separate existence is now well recognized by the art, and several coloring compositions embodying isomerized bixin are available, e.g., the commercially available annatto buttercolors. A characteristic publication which recognizes the distinction between bixin and isomerized bixin and elucidates some of the characteristics thereof and the mechanism of the transformation of the normally unstable bixin to the isomerized product is Iversen and Lam, "The Coloring Agent of Annatto-Buttercolors," Zeitschrift für Lebensmittel-Untersuchung und Forschung 97, 1 (July 1953). Thus, isomerized bixin has the advantage of stability and solubility but is much less economical for coloring than bixin itself, since it requires isomerization and has only approxmately one-fifth the coloring power of bixin.

Although the prior art has mixed together annatto and turmeric (curcuma) and employed the same in the coloring of lard, butter, or olive oil, as represented by Rorick U.S. Patent 163,610, dated May 25, 1875, his employment of "boiling heat" and from "12 to 24 hours to properly cook the coloring matter" leaves no doubt that the material prepared and employed as coloring material was not bixin, normally unstable bixin, or naturally occurring bixin, but rather the stable isomerized bixin. This rearrangement or isomerization of the unstable bixin by heating is also recognized in Barnett U.S. Patent 2,815,287, issued April 20, 1956. Barnett is generally concerned with the extraction of whole annatto seeds with a fatty oil, before or after swelling in the presence of water, to obtain an oil saturated with the annatto coloring material. At column 1, lines 54 and 55, Barnett states:

"We have also discovered that by heating the oily extract (an indefinite chemical extract of annatto), rearrangement of the bixin color compound produces a purer yellow color."

Others have recognized the same phenomenon, for example, Geminder et al., infra.

Another way besides isomerization in which bixin may lose its coloring capacity is by oxidation. The structure of bixin contains nine double bonds. Geminder et al., "The Use of Coloring," The Journal of The American Oil Chemists' Society 34, page 314 (June 1957), at page 315. It has been reported in oxidation studies that two of these double bonds are especially susceptible to oxidation, resulting in a deep red-colored compound. Viebrock, Beriche 67 (2), 377 (1934). Further tests have indicated that norbixin and methyl bixin behave similarly, but that their oxidation rate is much slower. (Geminder et al., loc. cit.). This is also supported by Iversen and Lam, loc. cit. In a search for "a more standardized and stable form of annatto color" which "would prove more desirable for coloring fatty foods," and "in order to overcome tinctorial variations," ethyl bixin was prepared and evaluated by Geminder et al. These authors state that "ethyl bixin is a color-standardized product which eliminates color variations resulting from natural product variations. In addition, it is a relatively stable product which is more resistant to oxidation and which does not produce 'off-colors' in stored margarine." However, the findings of Geminder et al. were that even the ethyl bixin was "an extremely unstable compound even when stored under an inert atmosphere with refrigeration." As shown by these authors, ethyl bixin loses 60% of its coloring power in one month at four degrees centigrade even when stored under nitrogen, and loses 80% of its coloring power when stored in air at a temperature of 37° centigrade for a period of one month. These figures on the "relatively stable product" show that the stability against oxidation of the normally unstable bixin itself leaves much to be desired. Due to its ready susceptibility to oxidation, bixin frequently loses in excess of 80% of its coloring power if exposed to air or other oxidative materials under normal temperatures for a period of one month or even less. Dry milk is only one of the many agents which when combined with the bixin expedite deterioration and loss of its coloring power through oxidation, as when combined in the manner of Files, U.S. Patent 2,042,173, issued May 26, 1936, although Files is indefinite as to the previous treatment of his annatto extract and it may be that a stable pigment, e.g., oxidized or isomerized bixin, was employed by Files. Such composition as disclosed by Files is in any event completely unsatisfactory and deteriorates to a very low coloring power in very short order if it is attempted to employ the powerful but normally unstable bixin as the major coloring component thereof. At any rate, food coloring with oxidized bixin is less than satisfactory, especially from an economic standpoint, since much greater quantities of the oxidized bixin are required to produce a desirable hue than when bixin itself is employed, due to the greatly diminished coloring power of the oxidized bixin.

Representative of further work in the art in an attempt to provide suitable annatto food coloring materials is Kocher, U.S. Patent 2,831,775, who extracts annatto seeds with alkaline propylene glycol with heating of the mixture under agitation. The product of such a procedure is not suitable for coloring of dairy products, especially fatty products such as oleomargarine, since propyleneglycol is not sufficiently fat soluble for this purpose. In addition, the alkaline conditions and the heating of Kocher result in demethylation of the normally unstable bixin to norbixin and isomerization thereof to the more stable isomerized bixin.

Another representative effort in this field is that of Bauernfeind, U.S. Patent 2,861,891, who produces dry, water-dispersible carotenoid coloring compositions by dissolving pigments in an edible oil, heating to effect supersaturation, emulsifying while warm in an aqueous gelable colloid solution, and setting the emulsion into a dry particulate form. His product is suitable for coloring of cake mixes but is unsuitable for coloring of fatty foods such as oleomargarine, since the gelatine of his composition agglomerates and does not go into solution therein.

A further representative attempt to use annatto coloring was made by Herlöw, U.S. Patent 2,546,748, who proposes to employ an oil in water dispersion comprising a solution of a fat-soluble coloring matter such as bixin or "arnotto" in an oleaginous solvent comprising a substantial amount of a partial ester of a fatty acid with an alcohol having more than one alcohol group of which at least one remains unesterified. His product is mainly proposed for use with a food product which is itseslf in dispersion form, but has not been widely accepted because his coloring composition is unstable and subject to precipitation and still contains at maximum less than a desirable concentration for coloring most food products, even though it employs a relatively expensive solvent.

Still other attempts to employ the normally unstable but powerful coloring pigment bixin in the coloring of fatty foods have all met with failure, due to its instability and the "reddening-out" phenomenon, so that efforts have been instead directed toward utilization of more stable isomerization or oxidation products of bixin, even though of greatly diminished coloring power, and to the attempted development of new bixin-type products which combine stability and a degree of coloring power comparable to that of the normally unstable bixin.

It would, therefore, be highly desirable to have available an economical food coloring composition comprising bixin, by which is meant normally unstable bixin and not isomerized or oxidized bixin or any other derivatives thereof, which retains its high degree of coloring power, which does not "redden-out" when employed for the coloring of fatty foods, especially oleomargarine where the problem is most critical, and which is not subject to any of the other disadvantages of previously available vegetable coloring compositions already proposed for coloring dairy products, especially oleomargarine. It would also be highly desirable to have available a process for the production of such composition, as well as edible oils such as present in oleomargarine colored with such an effective stable bixin coloring composition.

DEFINITION

As already stated, bixin is a naturally-occurring pigment which occurs in various plants, particularly in the seeds of *Bixa orellana*. As clearly summarized by Iversen and Lam, loc. cit., bixin itself, as obtained by extraction from annatto seeds, is normally unstable and a mixture of isomers having the formula $C_{25}N_{30}O_4$. It exists in trans and cis forms (so designated), both of which are unstable, but the cis form is most unstable. The cis form has the melting point 191.5° centigrade (fast heating) and 198° centigrade (slow heating). The trans form melts at 215–220° centigrade. Bixin is technically the monomethyl ester of the polyenedicarboxylic acid norbixin, is orange to red in color, crystalline and slightly acid. It is soluble in weak alkalis, but is hydrolyzed by stronger alkalis to methyl alcohol and norbixin. The transform is more insoluble in most solvents than the more unstable cis form. The absorption spectrum for the naturally occurring bixin extracted from *Bixa orellana* (annatto) seeds shows maxima at 470 and 500–502 m$\mu$ and slight maxima at 441 and 414 m$\mu$. These maxima are characteristic of the most unstable (cis) form of bixin. On a basis of the melting point and the absorption spectrum, by far the greater part of the bixin naturally occurring in annatto seeds and obtainable therefrom by extraction is in the unstable cis form. (Iversen and Lam, loc. cit.; Euler et al., Helv. Chim. Acta 15, 502 (1932) for characteristics of the more unstable cis bixin.) The more stable (trans) bixin is usually isolated by removing resins with solvent and centrifuging. Iversen and Lam, loc. cit. The pure trans bixin has absorption maxima at 509.5, 475, and 443 m$\mu$, according to Kuhn et al., Berichte 65, 1873 (1932).

Where used herein, the term "bixin" is given its usual and art-accepted meaning. It does not mean norbixin, or methyl bixin, or ethyl bixin, or isomerized bixin or oxidized bixin. It is normally unstable as extracted from annatto seeds. Its cis form is more unstable than its trans form, but both are unstable. The term "normally unstable bixin" as used herein in the specification and claims is intended to distinguish from oxidized bixin and isomerized bixin, in complete accord with the art-accepted knowledge and understanding which existed prior to the filing date of application Serial No. 667,682, filed June 24, 1957, of which application the present application is a continuation-in-part.

PRESENT INVENTION

Thus, the principal pigment derived from annatto is normally unstable bixin, as previously defined, and the pigment from turmeric is curcumin. Curcumin added to a vegetable oil, such as cottonseed oil or other like edible oils used in making oleomargarine, at a ratio of four to eight parts per million, the quantity used in this invention, does not appreciably affect the color when viewed through a 50 ml. Nessler tube. This result is contrasted to a marked visual effect from a concentration of five to eight parts per million of bixin in the same oil. This is because curcumin is weaker than bixin and absorbs very little light in the region of 450 to 550 millimicrons which is the most important absorption region of bixin. Accordingly, the color of the composition is essentially due to the bixin.

The basic discovery of this invention is that curcumin mixed with bixin prevents the bixin, or more accurately butter, margerine, shortening or cheese colored with the bixin, especially margarine, from changing color on standing. The used of the curcumin in connection with bixin makes the use of the normally unstable bixin commercially practical as a coloring ingredient for butter, margarine, cheese, and other fatty or oily foods.

A practical example of the coloring process is as follows, it being understood that the examples are given by way of illustration only and are not to be construed as limiting.

Example A

The bixin is extracted from annatto with a suitable solvent such as acetone. This yields as the primary coloring pigment the normally unstable bixin (Iversen and Lam, loc. cit.). The curcumin is similarly extracted with a solvent from turmeric. The extracts are treated by washing the hexane, or some other solvent in which the bixin and curcumin are virtually insoluble, to remove unwanted odors and other impurities. The extracts are allowed to crystallize and are ground in commercial pulverizing equipment to a mean crystal size of ten microns, preferably in oil as hereinafter described. The actual method of extraction, purification, and grinding is not important to this invention, and may embrace any of the procedures known to the art, so long as the bixin is not hydrolyzed, oxidized or isomerized in the process. As recognized by the art, this means that prolonged exposure to alkali or high temperatures and prolonged exposure to air should be avoided. The method of the present invention is far superior to any available method presently known to the applicant for the accomplishment of these important objectives conveniently and economically.

The turmeric and annatto extracts are combined in such a way that a certain ratio exists between the curcumin and bixin, these two compounds being the active ingredients of the compositions of the invention. Since there is no generally accepted assay procedure for these compounds, a spectrophotometric procedure will be described for determining their ratio. To determine the concentration of bixin, an acetone solution of the bixin is prepared and diluted until its absorbency at 500 millimicrons can be obtained. From this figure and the dilution used, the extinction coefficient 1%/1 cm. is obtained. Similarly, the extinction coefficient for curcumin at 500 millimicrons is obtained (carrotenoids present in the turmeric extract must be removed with hexane for the assay to be accurate).

The annatto and turmeric extracts are combined in such a way that the weight of the annatto extract times its extinction coefficient is about 1250 times as great as the weight of the turmeric extract times its extinction coefficient due to curcumin. This means that about 99.92% of the light of 500 millimicrons wavelength is absorbed by the annatto extract, and about 0.08% by the turmeric extract; or that the annatto extract in the mixture absorbs about 1250 times as much light of 500 millimicrons wavelength as does the curcumin. Since the principal coloring compound of annatto extract is the bixin, and since for all practical purposes the extract may be considered as 100% bixin if the above ratio is used, it is not necessary to isolate the bixin from the annatto extract to ascertain its concentration. The only precaution which must be observed is to remove carotenoids or carmelized materials from the turmeric extract before assaying for curcumin.

In the above example, the approximate ratio by weight of curcumin to the bixin is one and one-half to one (3/2 or .6/.4), taking the extinction coefficient of curcumin 1%/1 cm. as about 1.65 and the bixin 1%/1 cm. as about 2700, at 500 millimicrons. This represents the extract of approximately one part of turmeric to one part annatto by weight.

The extracted bixin and curcumin are mixed and ground to a mean crystal size of less than fifteen microns. Ten microns or less is preferred. This may be done by placing the pigments with three parts of vegetable oil in a ball mill and grinding, as previously indicated. After grinding, the oil-pigment mixture is ready for direct incorporation into butter or margarine or the like. This composition has a bixin content by weight of about 10% ($.4 \div 4 \times 100$).

The oil-pigment mixture is rapidly dissolved or dispersed in butter or margarine, making the coloring ingredient useful in commercial churn operations or in cold mixing of the color and margarine in small amounts as in home coloring operations. The amount of the pigment used will of course affect the intensity of the color imparted to the butter or margarine.

The bixin and curcumin extracts do not have to be perfectly pure, but it is preferred to remove obnoxious flavors and odors. The color obtained is independent of the natural impurities in the annatto and turmeric. Using the absorbencies as measures of quantities, the stabilizing action is best obtained when the absorption by the curcumin of light at a wavelength of 500 millimicrons is from .06% to 0.1% of that of the bixin for the same wavelength. This represents a mixture of from one to two parts curcumin to one part bixin. The curcumin can be increased or decreased depending on the degree of reddening that can be tolerated in the finished product. At the above levels, no reddening will be noticed. Substantial increases in the amount of curcumin do not greatly change the color obtained and mainly increase the cost without material effect. It is of interest to note that the amount of light absorbed by the curcumin at 500 millimicrons wavelength corresponding to green light is negligible as compared with the amount of the same green light absorbed by the bixin in the above pigment mixture.

Since the cause of the "reddening-out" of the bixin is unknown, it is impossible to explain the method by which the curcumin prevents this action. As mentioned above, the visual effect of the "reddening-out" is to decrease the amount of yellow light reflected by the margarine or other edible oils. Since the curcumin is added in such small quantities that it does not decrease the amount of yellow light reflected, it would appear that curcumin must in some way prevent the action causing the change in the bixin, possibly by virtue of the keto-enol system and the two very active hydrogens of the curcumin. However, the end action of curcumin in stabilizing the bixin is simply disclosed as an observable fact, and the actual mechanism of the action remains unknown.

*Example B*

Using spectrophotometric terms to relate bixin and curcumin concentration, a suitable mixture for coloring margarine is one part of annatto extract in oil, containing the bixin as its pigment, having an extinction coefficient of 1% per 1 centimeter equal to 250.0 at 500 millimicrons, and one part of turmeric extract in oil (containing curcumin as its pigment) having an extinction coefficient of 1% per centimeter equal to 0.2 at 500 millimicrons. The mixture, converting to pigment concentration, contains 9.2% bixin and 12% curcumin, based on the weight of the total suspension ($250/2700 = 9.2\%$; $0.2/1.65 = 12\%$). One pound (454 grams) of this mixture (which contains 4.6% bixin and 6% curcumin, or 21 grams of bixin and 27 grams of curcumin) will color about 12,000 pounds (5,448,000 grams) of margarine to a currently desired color shade and intensity. This example shows about four parts of bixin (3.92) per million of the margarine.

The ratio of the turmeric to annatto extracts (curcumin to bixin pigments) determines the stability of the coloring achieved. Satisfactory coloring can be achieved by quartering or doubling the turmeric (curcumin) content of the above examples, the range being about one part of curcumin per each 3.3 parts of bixin (one-fourth of the Example B ratio of 27/21) to about three parts of curcumin for each part of bixin ($2 \times$ the Example A ratio of 1.5 to 1). With only a quarter as much curcumin as is disclosed in the example, viz., about 6 grams in Example B, the colored margarine starts to exhibit some of the objectionable reddening tendency, so a 0.02% absorption ratio of light of 500 millimicrons by curcumin to bixin is preferred as the lower limit of this invention. At a ratio of two parts of curcumin to one part of bixin, the amounts of Example B would be 42 grams to 21 grams; at three parts to one, the amounts would be 63 grams to 21 grams. The upper limit of curcumin is determined by economic considerations, a one to one ratio of curcumin to bixin (i.e., in Example B 21 grams to 21 grams) being economical and yet stable in color under usual circumstances. Manufacturing processes vary and, if some of the curcumin should be destroyed during the preparation of the colored product, higher levels would be required. Since large increases in the amount of curcumin affect only the cost of the mixture, no upper limit for the proportion of the curcumin is set. Crystal size of the pigments affects the time required to mix the color. Ten microns mean size is preferred, but reasonably rapid mixing may be obtained with fifteen micron mean size, so this latter size is preferred as the upper limit for particle size according to the invention.

The coloring composition is operative in oily or fatty substances such as butter, margarine, vegetable or salad oils and lard and hydrogenated or stabilized and thickened cooking oils. For the purpose of this disclosure and the appended claims, the edible oil phases of these substances are classed as examples of edible fats or oils. As is well known in the art, oleomargarine comprises a major proportion of an edible oil, together with a minor proportion of milk solids and water. This type of composition, particularly the edible oil portion thereof, has presented great difficulty from the standpoint of coloring the same with acceptable food coloring, especially bixin, since when attempted to be employed in the coloring of oleomargarine or the edible fat component thereof, bixin coloring compositions previously available have been most unsatisfactory due to the notorious "reddening-out" phenomenon. The exact composition of oleomargarine has been defined by the United States Food and Drug Administration in its Standard of Identity for oleomargarine and has thus been a matter of public record for many years.

Various modifications and equivalents will be apparent to one skilled in the art and may be employed in the method and compositions of the invention without departing from the spirit or scope thereof, and the invention is therefore to be limited only by the scope of the appended claims.

I claim:

1. An edible oil product, colored with a stable coloring composition and having a coloring due essentially to the bixin dissolved therein, containing about four to about eight parts per million of normally unstable bixin and about four to about eight parts per million of curcumin, the curcumin being present in an amount between about one part of curcumin for each 3.3 parts of bixin and about three parts of curcumin for each part of bixin, the curcumin present in the said edible oil product serving to stabilize the normally unstable bixin against deterioration and to prevent undesirable reddening-out of the bixin pigment and thus to extend the shelf-life of the bixin-colored edible oil product.

2. The product of claim 1, wherein the ratio of curcumin to bixin by parts is approximately one to one.

3. A stable food coloring composition, suitable for coloring fatty food products, having its coloring power due essentially to the bixin contained therein, comprising an edible oil suspension of coloring pigments, one of which is normally unstable bixin and the other of which is curcumin, the curcumin being present in a ratio of between about one part for every 3.3 parts of bixin and about three parts of curcumin for each part of bixin, the bixin and curcumin pigments having a mean particle size not greater than about fifteen microns, said curcumin serving to stabilize said bixin against deterioration and reddening-out upon coloring of a fatty food product with said coloring composition.

4. The coloring composition of claim 3, wherein the ratio of curcumin to bixin by parts is about one to one.

5. The coloring composition of claim 3, wherein the percentage of bixin by weight of the coloring composition is between about four and about ten percent.

6. In a process for the production of a stable coloring composition for edible oily products comprising a suspension of normally unstable bixin and curcumin, having its coloring powder due essentially to the bixin contained therein, which composition is not subject to deterioration and in which the curcumin stabilizes the bixin against deterioration and reddening-out upon use of the coloring composition in coloring fatty food products, the steps of extracting bixin from annatto seeds with an organic solvent, transferring the thus-extracted bixin to an edible oil medium, reducing the mean particle size of the bixin to not greater than about fifteen microns by grinding in the edible oil medium, providing curcumin of a particle size not greater than about fifteen microns as a second component in the edible oil medium to give a suspension of bixin and curcumin in the edible oil medium, and adjusting the respective amounts of bixin and curcumin so as to give a ratio between about one part of curcumin for every 3.3 parts of bixin and about three parts of curcumin for each part of bixin, the steps being conducted without prolonged exposure of the normally-unstable bixin to any of alkali, high temperatures, and air, thus to avoid hydrolysis, isomerization and oxidation of the normally unstable bixin.

7. The process of claim 6, wherein the bixin is introduced into an edible oil medium and thereafter ground and the curcumin is introduced into an edible oil medium and thereafter ground, and the two pigment-containing compositions are combined.

8. The process of claim 6, wherein the ratio of curcumin to bixin by parts is about one to one.

9. An oleomargarine product colored with a stable coloring composition and having its coloring due essentially to the bixin contained therein, comprising as the coloring pigments thereof normally unstable bixin and curcumin, the curcumin being present in a ratio of between about one part for every 3.3 parts of bixin and about three parts of curcumin for each part of bixin, the bixin and curcumin pigments being substantially dissolved in the oil phase of the oleomargarine, said curcumin serving to stabilize said bixin against deterioration and reddening-out of said bixin in said oleomargarine and thereby serving to extend the shelf-life of the bixin-colored oleomargarine.

References Cited by the Examiner

UNITED STATES PATENTS

| | | | |
|---|---|---|---|
| 163,610 | 5/75 | Rorich | 99—148 |
| 1,203,594 | 11/16 | Ellis | 99—148 |
| 1,507,820 | 9/24 | Files | 99—148 |
| 2,042,173 | 5/36 | Files | 99—148 |

OTHER REFERENCES

National Dispensatory, 5th ed., publ. by Lea Brothers & Co., Phila., 1896, pp. 291, RS151.2, N27.

ABRAHAM H. WINKELSTEIN, *Primary Examiner.*